July 4, 1950  L. B. FORMAN  2,513,791
TRANSMISSION CONTROL SYSTEM
Filed May 12, 1947  3 Sheets-Sheet 1

INVENTOR.
Louis B. Forman
BY
Harness and Harris
ATTORNEYS.

INVENTOR.
Louis B. Forman.
BY
Harness and Harris
ATTORNEYS.

July 4, 1950

L. B. FORMAN 2,513,791

TRANSMISSION CONTROL SYSTEM

Filed May 12, 1947

INVENTOR.
Louis B. Forman.
BY
Harness and Harris
ATTORNEYS.

Patented July 4, 1950

2,513,791

UNITED STATES PATENT OFFICE 2,513,791

TRANSMISSION CONTROL SYSTEM

Louis B. Forman, Detroit, Mich., assignor to Chrysler Corporation, Highland Park, Mich., a corporation of Delaware Application May 12, 1947, Serial No. 747,377

14 Claims. (Cl. 74—472)

This invention relates to motor vehicles and refers more particularly to power transmission and the control mechanism therefor.

My invention has particular reference to the control mechanism for transmission systems of the type fully disclosed in the co-pending application of Syrovy et al., Serial No. 596,842, filed May 31, 1945, now Patent No. 2,490,604, issued December 6, 1949, in which the torque load is relieved either by momentary interruption of the engine ignition system which unloads positively engageable drive control elements and facilitates disengagement of such elements or by vehicle speed-responsive control means. In such transmission systems it is now customary to provide a kickdown control on transmission downshift accompanied by ignition interruption such that when the accelerator pedal is depressed to the limit of its travel in throttle-opening direction then the downshift will automatically take place so as to accelerate the vehicle in a more favorable drive ratio as in passing another vehicle or in climbing a steep grade. It is also customary to provide a vehicle speed responsive control on both upshift and downshift in the transmission. The upshift control sets the transmission for a faster drive or step-up to occur at or above a predetermined vehicle speed and the vehicle speed responsive control on transmission downshift is accompanied by ignition interruption such that when the vehicle is slowed down or brought to a temporary stop the transmission will be automatically stepped-down and thus be set for "break-away" acceleration in a favorable torque multiplying gear ratio. This invention relates to the control system, particularly the electrical control circuit, employed to operate the servo-motor means or hydraulic shift cylinder which automatically causes the upshifts and downshifts referred to above.

With transmissions of the type described above, it is possible, under rather unusual circumstances, to so manipulate the motor vehicle that the transmission becomes locked up in a shift position with the ignition system grounded out and under such conditions it becomes impossible to start the engine so as to manipulate the vehicle and effect a release of the locked-up transmission.

It is an object of my invention to provide a control system for a transmission of the type herein described which will prevent grounding out of the ignition system when the transmission is locked up, or at any other time except when ignition interruption is desired for change in speed ratio. Furthermore, operation of my control system so as to prevent grounding out of the ignition system during transmission lock-up is automatic and, accordingly, it is always possible to start the engine, even during a transmission lock-up, to effect a release of the locked-up transmission.

Another object of my invention is to provide means insuring against undesired grounding of the engine ignition in connection with transmission systems employing ignition grounding means for momentary relief of torque between positively engaged drive control elements whereby such elements may be readily relatively separated to release a drive through the transmission. Such systems are especially desirable where change in speed ratio drive is to be made while the engine is delivering power, the change being effected by releasing the positively engaged drive control elements which may be the elements of a positive clutch.

A further object of my invention is to provide a fool-proof transmission control system that is economical to manufacture and install.

A further object of my invention is to provide a fool-proof transmission control system that can be installed by merely making a few simple, inexpensive alterations to the transmission control systems now in operation and production. Such an arrangement permits change-over in the field as well as in current production lines without delay or unwarranted expense.

Another object of my invention is to provide a simplified and improved control system for a transmission of the step-up and step-down type wherein speed ratio changes are produced by power shifts under control of the driver and in response to the speed of travel of the motor vehicle.

Further objects and advantages of my invention will be more apparent from the following illustrative embodiment, reference being had to the accompanying drawings, in which:

Figure 1:
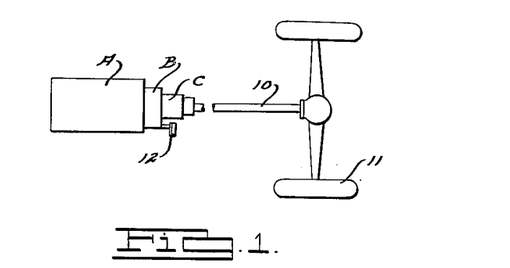
Fig. 1 is a diagrammatic top plan view of my power transmission applied to a motor vehicle.

In Fig. 1 the motor vehicle is of any desired type, that illustrated being of standard practice wherein an engine A transmits its drive through a propeller shaft 10 to drive the rear ground wheels 11. A fluid coupling and main friction clutch of known type may be provided within the housing B, the clutch being releasable to uncouple the engine from the transmission by a conventional clutch pedal 12. Rearwardly of housing B is the transmission C of any type incorporating positively engageable drive control elements which resist relative disengagement when under substantial torque load thereby making the use of some form of torque unloading means desirable as an incident to transmission step-down effected by release of the torque loaded drive control elements.

Figure 2:
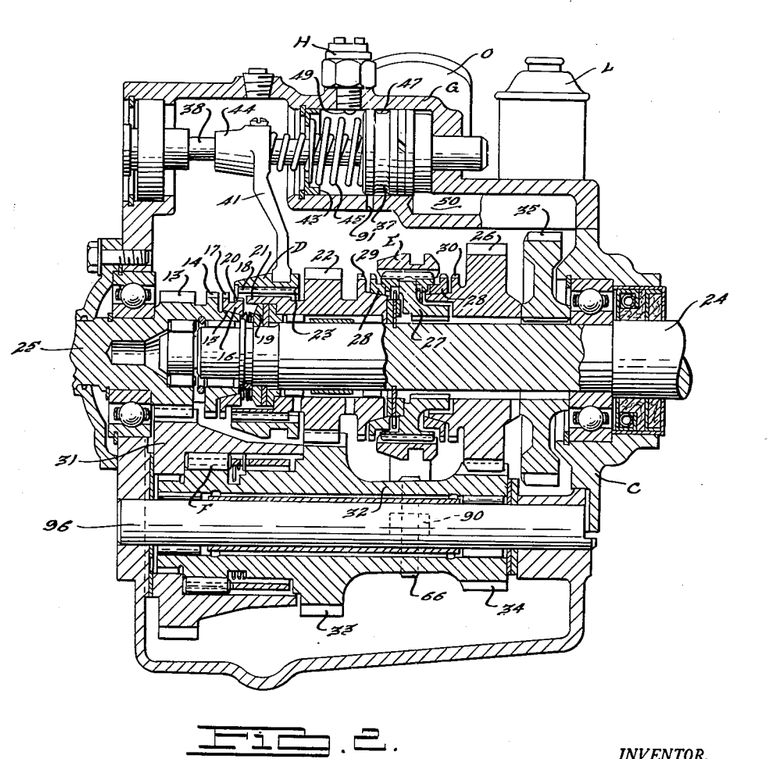
Fig. 2 is a sectional elevational view of a typical transmission to which my invention is applied for illustrative purposes.

The illustrated transmission C is of the underdrive type although other types including overdrive transmissions of known commercial form may be employed if desired. This transmission C comprises an input pinion 13 carrying clutch teeth 14 and a friction cone 15 constantly engaged by a blocker 16 carrying blocker teeth 17 adapted to be engaged by the teeth 18 of a clutch sleeve D when the latter is biased forwardly under asynchronous conditions in the rotation of pinion 13 and sleeve D. This sleeve together with clutch teeth 14 comprise relatively movable drive control elements for effecting step-up and step-down manipulation of the transmission.

Blocker 16 is lightly urged against the cone 15 by a spring 19 and has a lost-motion connection at 20 with the slotted end of a hub 21 of a high speed gear 22 such that the blocker may move relative to sleeve D between two positions blocking the sleeve, such positions being known as drive block and coast block depending on whether pinion 13 appreciably leads or lags the speed of the sleeve. The sleeve D is splined on hub 21 at 23, the arrangement being such that whenever sleeve D is rotating faster or slower than pinion 13 then the blocker teeth 17 will be aligned with the ends of the teeth of sleeve D and thus prevent shift of the sleeve into contact with teeth 14. However, when the pinion 13 is rotating faster than sleeve D and gear 22 and the sleeve is biased forwardly into blocked position, the driver may release the accelerator pedal to cause the engine and pinion 13 to slow down and as the pinion and sleeve pass through a synchronous relationship the blocker is moved from its drive blocking position toward its coast blocking position and when mid-way will unblock the sleeve and allow teeth 18 to pass between the blocker teeth and clutch with teeth 14.

Gear 22 is loose on the output shaft 24 whereas pinion 13 is an integral part of the input shaft 25. Loose on the output shaft 24 is a low speed gear 26. A manually shiftable clutch E, which has a splined connection with a hub 27 fixed to shaft 24, has associated therewith any commercial type of blocker synchronizers 28 such that clutch E may be shifted axially, either forwardly to high range or rearwardly to low range, to synchronously clutch shaft 24 either with the high speed gear 22 at the teeth 29 or with the low speed gear 26 at the teeth 30. Manual shifts of clutch E are facilitated by release of the main clutch at B by means of the usual clutch pedal 12.

Pinion 13 has constant mesh with a countershaft gear 31 which operates through an overrunning clutch F to drive the countershaft cluster 32 comprising gears 33 and 34 respectively in constant mesh with gears 22 and 26. For reverse an idler gear (not shown) having constant mesh with gear 34 is shifted rearwardly to mesh with gear 35 fixed on shaft 24, clutch E being maintained in its illustrated neutral condition during reverse drive.

When clutch E is shifted rearwardly to clutch gear 26 to shaft 24 then an overrunning relatively slow speed low range drive or first speed is transmitted from shaft 25 to shaft 24 by way of gear 31, overrunning clutch F, and gears 34 and 26. If at such time sleeve D is biased forwardly into drive block condition and the shaft 25 allowed to coast down by overrunning release of clutch F, then when teeth 14 are thus synchronized with sleeve D the latter, as aforesaid, will be unblocked and will clutch with teeth 14 to effect a step-up in the transmission during coasting conditions so that now a two-way relatively fast speed low range drive or second speed is effected from shaft 25 through sleeve D to gear 22 thence by way of gears 33, 34, and 26 and through clutch E to shaft 24, clutch F overrunning.

If clutch E is shifted forwardly to clutch gear 22 to shaft 24 then an overrunning relatively slow speed high range drive or third speed is transmitted from shaft 25 to shaft 24 by way of gear 31, overrunning clutch F, gears 33 and 22 thence through clutch E to shaft 24. In the same manner as aforesaid in connection with the step-up from first to second, sleeve D may be clutched under coast synchronous conditions with teeth 14 to effect transmission of a two-way relatively fast speed high range drive or direct fourth of a speed ratio of 1 to 1 from shaft 25 directly through sleeve D and clutch E to shaft 24, clutch F overrunning.

A more complete description of the specific transmission described in this application, and its method of operation, is set forth in the Syrovy et al. application, Serial No. 596,842, filed May 31, 1945.

Speed responsive governor means O is provided to control forward bias of sleeve D as well as rearward bias thereof as will presently be more apparent. Furthermore, during drive in either second or fourth speed, a downshift or step-down to first or third speed respectively may be effected under control of the driver preferably by a full depression of the accelerator M to operate kickdown switch P.

Figure 4:
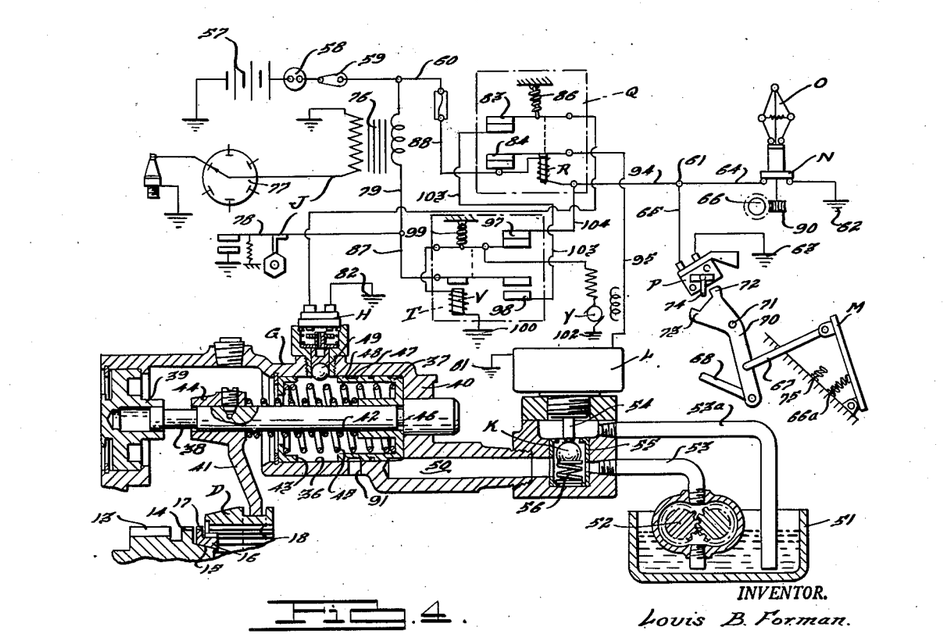
Fig. 4 is a diagrammatic view, with parts of the system shown in section, illustrating my control system when the engine is running and the transmission is operating in a downshifted ratio below the speed at which the governor switch opens.

Referring now to Fig. 4, I have illustrated servo-motor means in the form of a fluid motor or shift cylinder G for controlling shift of sleeve D, this motor comprising a cylinder 36 slidably receiving a piston 37 which slidably receives a rod 38 which is mounted to reciprocate in the guideways 39, 40. Fixed to this rod 38 is the collar 44 of a yoke 41 connected with sleeve D to effect shift thereof. A relatively small force, preloaded, engaging spring 42 is threaded on rod 38 and is disposed between piston 37 and yoke 41 to provide a lost-motion thrust transmitting connection between these elements such that piston 37 may move forwardly or to the left for its power stroke, being limited by relief ports 91 and abutment 43 in advance of the full clutching shift of sleeve D. On movement of piston 37 to the left the engaging spring 42 is compressed and this compressed spring then urges the yoke collar 44 towards the left so that the sleeve D is moved into engagement with blocker 16 and, after coast, with teeth 14 of pinion 13. The yoke collar 44 abuts against the exposed end of guideway 39 when the sleeve D has come to rest in its fully engaged upshifted position. A relatively large force, pre-loaded, kickdown spring 45 is disposed between abutment 43 and piston 37 and serves to return the piston and sleeve D to the Fig. 4 position. The spring 45 is thus adapted to effect disengaging bias of sleeve D relative to teeth 14. It will be noted that as piston 37 moves toward the left end of cylinder 36, to accomplish step-up or up-shift engagement of sleeve D, ports 91 of cylinder 36 are uncovered at such a time as to prevent engagement of piston 37 with abutment means 43. Ports 91 constitute relief ports to prevent pressure, in excess of that required to operate piston 37, from building up in the hydraulic system. At the same time ports 91 serve as a piston positioning means and eliminate the need for additional piston abutment or positioning means. Ports 91 are uncovered just prior to engagement of piston 37 with abutment means 43, therefore, the pressure against the piston is automatically reduced and the piston 37 is not rammed against the abutment 43, accordingly, the noise that would be caused by such a contact of metallic parts 37 and 43 is eliminated. It is obvious that ports 91 also serve to properly position piston 37 in cylinder 36 so that sleeve D may be moved to its up-shift position through the combined action of the pressure fluid medium and the engaging spring 42. In addition to the above advantages, ports 91 prevent binding between the piston 37 and the shift rail 38 or the abutment means 43 as the pressure against the piston 37 has been relieved before the piston reaches abutment 43 and this retains the piston 37 free at the up-shift end of the cylinder 36 without forcing the piston against the abutment 43. Accordingly, the piston is free to immediately return to downshift position as soon as the cylinder 36 is vented.

Figure 5:
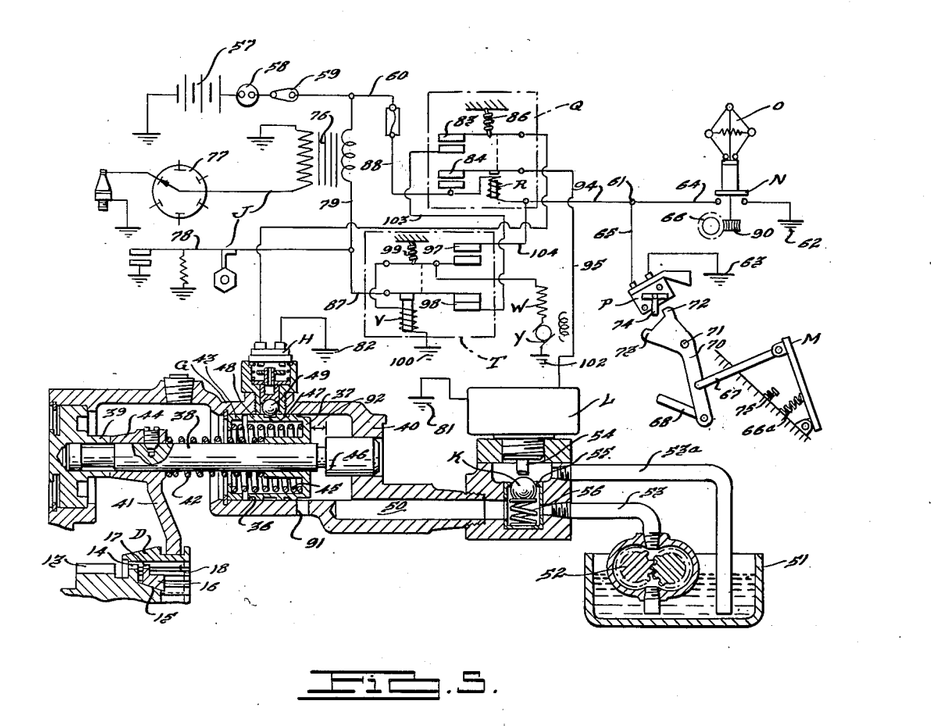
Fig. 5 is a diagrammatic view partly in section illustrating the control system shown in the Fig. 3 with the engine running and when the transmission is operating in an upshifted ratio above the speed at which the governor switch opens.

Rod 38 has a shoulder 46 which in Fig. 4 engages the face of piston 37 but which, when the piston and rod 38 are moved to the end of their forward strokes, see Fig. 5, is spaced rearwardly of the piston to provide a gap 92 equal to the difference in length of the strokes of the piston and rod. This gap is utilized to close an ignition control switch H for interrupting the engine ignition system J. Piston 37 is provided with an annular groove 47 formed in its skirt portion to define the cam portion 48 which operates the ball actuator 49 for closing switch H.

The pressure fluid supply system has been diagrammatically represented in Figs. 4 and 5 and comprises a suitable supply 51 of oil which is usually at the transmission sump. A pump 52, preferably driven by the transmission output shaft 24, draws the oil from the supply 51 for delivery under pressure through pipe 53 thence to the passage 50 under control of a ball valve K. When the valve K is closed the oil is forced directly from the pump 52 through passages 53 and 50 to shift cylinder G where it moves the piston 37 and shift rod 38 to the left thus causing yoke 41 to shift sleeve D so as to cause an up-shift or step-up to second or fourth speed depending on whether clutch E is engaged with first speed gear 26 or third speed gear 22. Valve K is closed by the spring pressure of valve spring 56 and the pressure of the fluid medium when the solenoid L is deenergized and the solenoid plunger 54 is in its retracted position. When solenoid L is energized the solenoid plunger 54 is extended and ball valve K is opened by being forced downwardly off valve seat 55 so that oil now flows from the pump 52 through the line 53 to open valve K and back to the supply sump via return line 53a. The open valve K prevents sufficient pressure developing in line 50 to move piston 37 against the force exerted by piston retaining spring 45. It will be subsequently pointed out that the solenoid L is energized only in first and third speeds below the output shaft speed at which the governor switch opens N, or when the kickdown switch P is manually closed, and consequently in second and fourth speeds, where most of the actual driving time is accumulated, the solenoid L is in a de-energized condition. This arrangement increases the life of the solenoid L and accordingly renders the system more economical than one where the solenoid L remains energized during the majority of the driving time.

In Fig. 4 the ball valve K is shown depressed to open position by operation of the solenoid L which is electrically energized to depress the valve against the force of the return spring 56 and to maintain the valve in such position. This keeps the cylinder piston 37 in its downshifted position. Fig. 5 shows the solenoid de-energized with the valve K in closed position and the cylinder piston 37 moved to the upshifted position by the pressure fluid now directed to servo-motor G.

Energization and de-energization of solenoid L is brought about by operation from one position to another of either of two control members respectively actuated or controlled by vehicle speed and by the driver. Electrical circuit means for this purpose includes a grounded storage battery 57 for supply of electrical energy through ammeter 58 and ignition switch 59 to a wire 60, thence through line 88 and solenoid R of double contact relay Q and through line 94 to a terminal 61 whence either of two parallel grounds 62 or 63 will complete a circuit. Energization of solenoid R closes connected contacts 83 and 84 against the tension of spring 86. On closing contact 84 electrical energy is supplied, via shunt connection through the contact 84 and then a line 95, to the solenoid L and thence to ground at 81. In Fig. 4 the solenoid L is energized as a result of energization of the aforesaid circuit, which grounds terminal 61 at 62 through line 64 and closed governor switch N.

This governor switch N constitutes one of the two aforesaid control members for solenoid L and is opened at predetermined vehicle speeds under control of a governor O driven at 66 by some suitable gear means 90 which operates at a speed proportional to vehicle speed such as the transmission countershaft 96 or the driven shaft 24, if desired.

The other parallel circuit for grounding terminal 61 at 63 is controlled by a kickdown switch P which is open in Fig. 4 as accelerator M is released under control of its return spring 66a. The accelerator thus constitutes the other of the two aforesaid control members for solenoid L and is suitably connected with the usual engine carburetor throttle valve by linkage 67, 68 which serves to open and close the throttle valve. Interposed in the throttle valve operating linkage 67, 68 is a lever 70 pivotally supported at 71 and having spaced fingers 72, 73 for operating the switch finger 74 of the snap-type of switch P. The arrangement is such that as the throttle valve approaches its wide open position by depressing accelerator M, finger 73 is engaged with finger 74 during approximately the last 5 degrees or so of throttle opening movement.

If desired a pick-up spring 75 may be located at a suitable point in the throttle operating mechanism such that it imposes a yielding load on the accelerator pedal M, in addition to the return spring 66a, at the time when the pedal moves to close switch P. The driver thus will not accidentally close switch P at the end of the pedal stroke as a noticeable additional effort is required to depress the accelerator to bring the kickdown switch P into operation. When the accelerator is then released the finger 72 operates to open the switch P near the fully released position of the accelerator. The parts are so arranged that switch P will be opened by finger 72 whenever the accelerator pedal is fully released.

The ignition system J is conventional and includes coil 76, distributor 77, and breaker 78. From the primary side of the coil 76 an ignition interruption grounding line extends by wires 79 and 81 to double contact relay T where, if contacts 98 are closed, the circuit extends through line 103 to relay Q where, if the contacts 83 are closed the circuit may be completed through the interrupter switch H thence to ground at 82. It will thus be seen that ignition interruption can only occur when both contacts 98 of relay T and contacts 83 of relay Q are closed at the same time for that is the only time there will be a closed circuit through the interrupter switch H. As will be pointed out hereafter these contacts are closed at the same time only when the engine is running, the transmission is in upshifted position and either the governor switch N or kickdown switch P closed.

Figure 3:
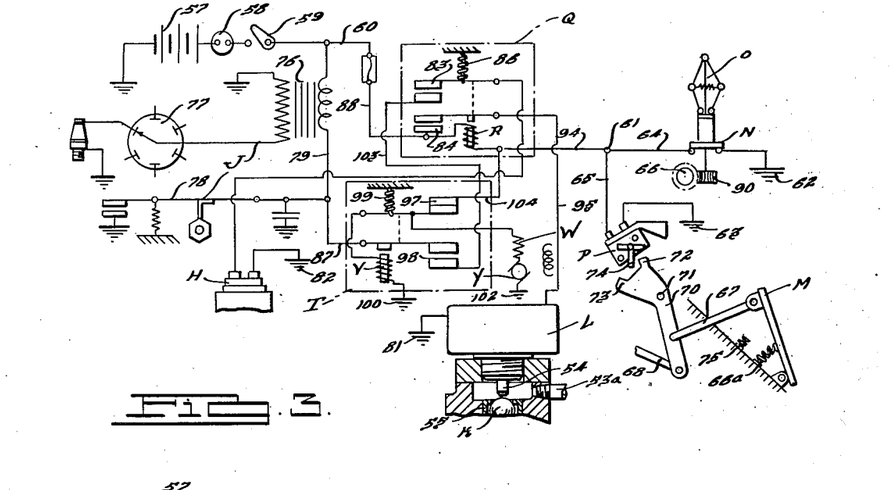
Fig. 3 is a diagrammatic view of my control system when the ignition system is turned off preliminary to starting the engine.

Fig. 3 is a diagrammatic sketch of my electrical control circuit when the engine is not running and the ignition is turned off. It will be noted that this circuit differs from the circuit disclosed in the Syrovy et al. application primarily by the insertion of relay T between the primary side of coil 76 and the relay Q. When installing this relay T it must be connected to the generator Y and some means of preventing flow-back, such as the resistance W, should be connected in the line to the generator Y. In other words to convert the circuit shown in the Syrovy et al. application into a fool-proof electrical control circuit that will not ground out the ignition system in the event the transmission becomes locked up with the interrupter switch H held closed by the cam surface 48 of piston 37, it is merely necessary to install a relay T in the present circuit and connect this relay to the generator Y through a resistance W. The cost of the relay, resistance and connecting leads is nominal and the installation work can be done in the field or in present production lines with a minimum of labor and expense. With the system shown in Fig. 3, as the ignition is not turned on, it is obvious that neither relay Q nor relay T is energized, valve K is closed, interrupter switch H and kickdown switch P are open and governor switch P is closed.

In operation, with the parts arranged as in Fig. 4, the vehicle is at a standstill with the ignition on and the engine is idling. With transmission C in neutral and the vehicle at standstill the governor switch N is closed thus effecting energization of solenoid R which closes contacts 83 and 84 and supplies current for the energization of solenoid L which opens valve K to vent hydraulic motor G and maintains sleeve D released as shown. Interrupter switch H is open as piston 37 is in downshifted position so the ball actuator 49 is free of the piston 37. Kickdown switch P is open and the accelerator pedal M is released. Relay T is not energized when the governor switch N is closed for the current furnished by the engine driven generator Y is for the most part conducted to ground at 62 by a short circuit through closed contacts 97, line 104, line 94, line 64 and closed governor switch N. The resistance of this circuit is so small, as compared with the resistance of the circuit from the generator Y through the solenoid V of relay T to ground at 100, that insufficient current flows through solenoid V to energize it and move connected contacts 97 and 98 against the tension exerted by spring 99. As contacts 98 are open, until after the governor switch N opens, the interrupter circuit is inoperative under such conditions. When the governor switch N opens so as to remove the short circuit across the relay T then the current from generator Y flows through and energizes solenoid V, due to ground at 100, which causes contacts 98 to close against tension of spring 99 and this opens contacts 97. With the short circuit across the relay T once removed by the opening of contacts 97, due to energization of solenoid V, then the governor switch N will not short out the relay T on subsequent downshift. As long as the engine does not stall the generator Y will keep contacts 98 closed and relay T will in no way interfere with the normal operation of relay Q. If the engine stalls then contacts 98 open, contacts 97 close and the system is ready for another cycle but in no case is the ignition system prevented from operating.

For an ordinary forward drive, the operator shifts the sleeve E forwardly to engage third speed gear 22 for driving in high range and by depressing the accelerator pedal the vehicle is driven in third up to any desired speed. At some predetermined speed of vehicle travel, 12–14 miles per hour in third speed, or higher or lower as desired, governor O operates to open switch N (see Fig. 5). This energizes relay T so as to open contacts 97 and close contacts 98, and also de-energizes solenoid R which opens contacts 83 and 84 and this de-energizes solenoid L whereupon valve K is closed by operation of the spring 56 and this closes off pressure fluid return pipe 53a so as to cause pressure to build up in passage 50. Piston 37 then moves forwardly for its upshift stroke until relief ports 91 are uncovered and the fluid pressure is reduced in the piston line to that required to hold the piston in its upshifted position. This forward movement of piston 37 compresses springs 45 and 42 and momentarily closes switch H which, however, does not interrupt the ignition circuit because switches N and P are open as are the contacts 83 and 84 which breaks the circuit through the interrupter switch H. When the piston 37 is at the end of its forward stroke switch H is also open as the ball 49 is then aligned with the piston groove 47.

When piston 37 moves forwardly spring 42 operates to move rod 38 and sleeve D forwardly only until sleeve D comes up to its drive blocked position where it remains until the vehicle driver releases the accelerator pedal for the upshift to fourth speed by allowing the engine to slow down sufficiently to synchronize the speeds of teeth 14 and sleeve D and to effect unblocking action of the blocker 16. The upshift is then completed and the drive then is in the cruising fourth speed or direct drive.

When the governor O operates to open switch N it is apparent that this de-energizes the relay solenoid R which permits spring 86 to open contacts 83 and 84 so that the solenoid L is then de-energized and the valve K closed so that pressure fluid is pumped directly from the pump 52 to the shift cylinder G where the piston 37 will be moved forward to shift sleeve D into engagement with teeth 14 of pinion 13 and thus accomplish the upshift to fourth speed.

Downshift from fourth speed back to third speed is effected either by closing the kickdown switch P or by the closing of governor switch N. Thus when the driver desires to effect the downshift from fourth speed he fully depresses the accelerator M to close switch P and inasmuch as the engine is delivering its full power at the attendant wide open throttle, it is desired to effect torque relief at the teeth 14, 18 to facilitate the release of sleeve D for the downshift. Therefore, when switch P is closed this not only energizes relay solenoid R which closes contacts 83 and 84 but it also energizes solenoid L to vent motor G. Closing of contacts 83 and 84 coincidentally affords a circuit through closed contacts 83 and 98 and through interrupter switch H for grounding at 82 when switch H is closed by the rearward movement of piston 37. The closing of the kickdown switch P, or the governor switch N, for downshift, does not effect the relay T for contacts 97 are already open and the circuit through closed contacts 98 is in series with the interrupter switch H so that relay Q functions as though relay T had not been added to the usual circuit. It is only when the engine is originally started or after a stall that relay T becomes operative. When motor G is vented, piston 37 moves rearwardly a small amount independently of sleeve D under the force of spring 45 in taking up the aforesaid gap 92 until the piston engages the rod shoulder 46. When the piston moves to take up the gap 92, cam 48 engages switch actuator 49 and closes the switch H thereby completing the grounding circuit at 82 so as to interrupt the ignition system. This instantly unloads the torque load at the teeth of sleeve D and permits disengagement of sleeve D and teeth 14 of pinion 13 whereupon the piston 37 completes its rearward or return stroke back to the Fig. 4 position, moving with it, because of shoulder 46, the rod 38 and sleeve D as a unit. As soon as the sleeve D clears the teeth 14 the ignition is restored to normal operation because ball 49 clears the cam 48 and opens switch H. When the vehicle again reaches the governor switch opening speed and the accelerator M is later released then fourth speed is again restored as aforesaid. It will thus be seen that relay Q controls the valve means K to effect upshift and downshift whereas relay T controls ignition interruption.

For the downshift from fourth to third under control of the vehicle speed it is only necessary to reduce the vehicle speed to or below the speed at which governor switch N closes. This energizes relay solenoid R which closes contacts 83 and 84 and causes energization of solenoid L whereupon motor G effects the downshift just as outlined in connection with the closing of kickdown switch P.

When the clutch E is in its rearward low range position, then the upshift and downshift under control of sleeve D will be just as set forth in connection with the corresponding functions occurring for the high range setting. However, if governor O is driven from the countershaft, as at 66 in Fig. 2, then the governor O will function at somewhat lower car speeds depending on the gear ratios for first and second as compared with third and fourth, as will be readily understood.

Prior to my invention it was possible, under rather unusual circumstances, to so manipulate a vehicle, with a transmission of the type herein described, that the transmission became locked-up in two opposing gear ratios at the same time and this caused an engine stall. When so locked-up the ignition interruption switch H was often held in closed position by the ushifted piston 37 and the ignition system became grounded out. This prevented the engine being started and consequently prevented movement of the vehicle either forwardly or in reverse to effect a release of the locked-up transmission. Such a locked up condition would occasionally arise when the vehicle operating in a forward moving gear was brought to a sudden stop on a hill or ramp and was then allowed to drift backwardly. Under such conditions the sudden stop would not allow sufficient time to complete the automatic downshift and the backward drift caused the overrunning clutch F on the countershaft 96 to lock so as to cause a drive through this clutch F, as well as through the engaged, upshifted direct speed clutch D. Consequently two opposing gear drives would act on the output shaft 24 and a stalled, locked-up condition resulted, frequently with the ignition grounded out at switch H. Such a condition would also arise occasionally when operating on icy or snow covered roads. The vehicle operator, in attempting to move forwardly, would cause the rear driving wheels to dig channels in the ice or snow and when the accelerator was released the vehicle would drift backwardly to lock the transmission in two opposed gear drives with the ignition often grounded out. Another troublesome condition that occasionally arose, prior to my invention, was a grounding out of the ignition with a locked-up transmission when the ignition switch was turned off prematurely in coming to a stop, the vehicle being in a forward gear drive. Under such circumstances the opening of the ignition switch deenergized solenoid L and closed valve K. As the vehicle was still rolling forwardly in gear, the oil pump 52 would continue to pump oil into cylinder 36 of servo-motor G and would tend to move sleeve D to an upshifted position. If, when the vehicle came to rest it happened to roll backwardly, the backward movement effected an unblocking action of the teeth 18 of sleeve D and compressed spring 42 forced sleeve D into engagement with the teeth 14 of drive pinion 13. When the vehicle drifted backwardly, as would often be the case in coming to rest on a hill or ramp, the overrunning clutch F would lock up to cause a drive through the countershaft 96 as well as through the direct drive clutch sleeve D and output shaft 24 would be acted upon by two opposed driving gears. Often the ignition interruption switch H would be held closed by piston 37 under such conditions and thus the engine could not be started to effect a release of the locked-up transmission by vehicle manipulation.

By my invention it is always possible to start the engine after an engine stall, regardless of the condition of the ignition interrupter switch H, and accordingly the vehicle can be manipulated forwardly or rearwardly to effect a release of the locked up transmission.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In a power transmission for a motor vehicle having an engine with an ignition system, a driving shaft adapted to receive drive from the engine, a driven shaft adapted to drive the vehicle, change speed means operably disposed between said shafts for effecting step-up and step-down variation in the speed ratio drive through the transmission, a pressure fluid operated motor for controlling said change speed means, a pressure fluid source connected to said motor and operable to deliver fluid under pressure to said motor, valving means for controlling said delivery of pressure fluid from said source to said motor so as to selectively effect fluid operation of and venting of said motor and an electrical control system for said transmission comprising a first double contact relay for control of said valving means, one of said contacts being connected to ground through a parallel circuit containing a vehicle speed response control means and a driver operated control means, the other of said contacts being connected to ground through an ignition interrupter means arranged in series with said contact, and a second double contact relay connected in said system, one of the contacts of said second relay being connected in series with the second mentioned contact of said first relay and said interrupter means and the other contact of said second relay being connected to said first relay so to short circuit said second relay when said last mentioned contact is closed, said second relay operating to cause ignition interruption on step-down but preventing ignition interruption on engine start and engine stall.

2. In a power transmission for a motor vehicle having an engine with an ignition system, a driving shaft adapted to receive drive from the engine, a driven shaft adapted to drive the vehicle, change speed means operably disposed between said shafts for effecting step-up and step-down variation in the speed ratio drive through the transmission, a pressure fluid and spring operated motor for controlling said change speed means, a pump connected to said motor and operable to deliver fluid under pressure to said motor, valving means for controlling said delivery of pressure fluid from said pump to said motor so as to selectively effect fluid operation of and venting of said motor, and an electrical control system for said transmission comprising a first double contact relay for control of said valving means, one of said contacts being connected to ground through a vehicle speed responsive control means and the other of said contacts being connected to ground through an ignition interruption means, and a second double contact relay connected in said control system so as to cause ignition interruption on step-down but prevent ignition interruption on engine start and engine stall.

3. In a power transmission for a motor vehicle having an engine with an ignition system, a driving shaft adapted to receive drive from the engine, a driven shaft adapted to drive the vehicle, change speed means operably disposed between said shafts for effecting step-up and step-down variation in the speed ratio drive through the transmission, a pressure fluid and spring operated motor for controlling said change speed means, a pump connected to said motor and operable to deliver fluid under pressure to said motor, valving means for controlling said delivery of pressure fluid from said pump to said motor so as to selectively effect fluid operation of and venting of said motor, an electrical control system for said transmission comprising a first double contact relay for control of said valving means, one of said contacts being connected to ground through a vehicle speed responsive control means and the other of said contacts being connected to ground through an ignition interruption means, and a second double contact relay connected in said control system so as to cause ignition interruption on step-down but prevent ignition interruption on engine start and engine stall, one of said contacts of said second mentioned relay being connected in series with the second mentioned contact of said first relay and said ignition interruption means and the other contact of said second mentioned relay being connected to said first relay so as to short circuit said second relay when said last mentioned contact is closed.

4. In a power transmission for a motor vehicle having an engine provided with an ignition system; an electrical control system for a servo-motor actuated shift member adapted to provide means for effecting step-up and step-down variation in the speed ratio drive through the transmission comprising a first double contact relay, the contacts of the said first relay being normally biased open but adapted to be closed by energization of associated electro-magnetic means selectively controlled by vehicle speed responsive means and manually operated means connected to said first relay, means including a shunt connection through one of the contacts of said first relay providing a circuit for controlling an electro-magnetically operated valve means to control actuation of said shift member, the other contact of said first relay being grounded through a series connected ignition interruption means, and a second double contact relay for effecting ignition interruption on transmission step-down but preventing ignition interruption on step-up in speed ratio drive on engine start and on engine stall, one of the contacts of said second relay being normally biased closed while the other contact is held open, said normally closed contact being connected to the first relay so as to provide means to short circuit said second relay on transmission step-up, on engine start and engine stall to prevent ignition interruption under such conditions, the other contact of said second relay being connected in series with the contact of said first relay that is connected to the ignition interruption means, and electro-magnetic means operable upon de-energization of said first relay to close said second contact of said second relay and open said first contact of said second relay so as to remove the short circuit across the second relay and automatically render operative the ignition interrupter means for transmission step-down.

5. In a power transmission for a motor vehicle having an engine provided with an ignition system; an electrical control system for a servo-motor actuated shift member adapted to provide means effecting step-up and step-down variation in the speed ratio drive through the transmission comprising a first double contact relay, the contacts of said relay being normally biased open but adapted to be closed by energization of associated electro-magnetic means controlled by vehicle speed responsive means connected to one contact of said first relay, means including a shunt connection through one of the contacts of said first relay providing a circuit for controlling an electro-magnetically operated valve means adapted to cause actuation of said shift member, the other contact of said first relay being grounded through a series connected ignition interruption means, and a second double contact relay for effecting ignition interruption on transmission step-down but preventing ignition interruption on step-up in the speed ratio drive, on engine start and engine stall, one of said contacts of said second relay being normally biased closed while the other contact is held open, said normally closed contact being connected to the first relay so as to provide means to short circuit said second relay on step-up in the speed ratio drive, on engine start and on engine stall to thereby prevent ignition interruption under such conditions, the other contact of said second relay being connected in series with the contact of said first relay connected to the ignition interruption means, electro-magnetic means operable upon de-energization of said first relay to close said second contact of said second relay and open said first contact of said second relay so as to remove the short circuit across the second relay and automatically render operative the ignition interrupter means for transmission step-down, and a vehicle speed responsive means for controlling the supply of electrical energy to effect energization of said second relay, contact operating, electro-magnetic means.

6. In a power transmission for a motor vehicle having an engine with an ignition system; servomotor means to effect changes in the speed ratio drive through the transmission, and an electrical control system comprising a first double contact relay for control of the step-up and step-down variation in the speed ratio drive through the transmission, one of the contacts of said first relay being connected to ground through a vehicle speed responsive control means, the other contact of said first relay being connected to ground through an ignition interruption control means, and a second double contact relay arranged in said control system so as to cause ignition interruption on step-down but prevent ignition interruption on step-up, on engine start and on engine stall, one contact of said second relay being connected in series with the second mentioned contact of said first relay and said ignition interruption control means, and the other contact of said second relay being connected to said first relay so as to provide means to short circuit said second relay on step-up on engine start and on engine stall, and vehicle speed responsive means associated with said second relay to provide means for energizing said second relay when said first relay has automatically removed the short circuit across said second relay.

7. A power transmission for driving a motor vehicle having an engine provided with an ignition system; a transmission drive-controlling element operable from a first position to a second position for effecting a step-up change in the transmission drive speed ratio, and from said second position to said first position, when operation of said ignition system is interrupted to relieve thrust at said drive-controlling element, to effect a step-down change in the transmission drive speed ratio; a pressure fluid operated motor for actuating said drive-controlling element; a pressure fluid supply connected to said motor, a solenoid operated valve means to control operation of said motor, and an electrical control system for said transmission comprising a first double contact relay for control of said valve means, one of said contacts being connected to ground through a vehicle speed responsive control means and the other of said contacts being connected to ground through an ignition interruption means, operation of said first relay controlling said motor to effect step-up and step-down, and a second double contact relay providing ignition interruption on step-down but preventing ignition interruption on engine start or engine stall, one contact of said second relay being connected to the contact of said first relay connected with the ignition interruption means, and the other contact of said second relay connected to said first relay to short circuit said second relay on engine start and engine stall and prevent ignition interruption under such conditions.

8. In a power transmission for a motor vehicle having an engine with an ignition system, a driving shaft adapted to receive drive from the engine, a driven shaft adapted to drive the vehicle, change speed means operably disposed between said shafts for effecting step-up and step-down variation in the speed ratio drive through the transmission, a pressure operated motor for controlling said change speed means, a valve controlled means for varying the pressure differential within said motor, and an electrical control system for said transmission comprising a first double contact relay for control of said valve controlled means, one of said contacts being connected to ground through a parallel circuit containing a vehicle speed response control means and a driver operated control means, the other of said contacts being connected to ground through an ignition interrupter means arranged in series with said contact, and a second double contact relay connected in said system, one of the contacts of said second relay being connected in series with the second mentioned contact of said first relay and said interrupter means and the other contact of said second relay being connected to said first relay so to short circuit said second relay when said last mentioned contact is closed, said second relay operating to cause ignition interruption on step-down but preventing ignition interruption on engine start and engine stall.

9. A power transmission for driving a motor vehicle having an engine provided with an ignition system; a transmission drive-controlling element operable from a first position to a second position for effecting a step-up change in the transmission drive speed ratio and from said second position to said first position, when operation of said ignition system is interrupted to relieve thrust at said drive-controlling element, to effect a step-down change in the transmission drive speed ratio; a pressure operated motor for actuating said drive-controlling element; valve controlled means to operate said motor, and an electrical control system for said transmission comprising a first double contact relay for control of said valve means, one of said contacts being connected to ground through a vehicle speed responsive control means and the other of said contacts being connected to ground through an ignition interruption means, operation of said first relay controlling said motor to effect step-up and step-down, and a second double contact relay providing ignition interruption on step-down but preventing ignition interruption on engine start or engine stall, one contact of said second relay being connected to the contact of said first relay connected with the ignition interruption means and the other contact of said second relay connected to said first relay to short circuit said second relay on engine start and engine stall and prevent ignition interruption under such conditions.

10. In a power transmission for a motor vehicle having an engine provided with an ignition system including an engine driven generator, a driving shaft adapted to receive drive from the engine, a driven shaft adapted to drive the vehicle, change speed means operably disposed between said shafts including relatively movable, positively engageable, drive control elements for effecting step-up and step-down variation in the speed ratio drive through the transmission, differential pressure operated means for effecting engagement and disengagement of said drive control elements, electrically operated valve means for controlling operation of said differential pressure operated means, and an electrical control system for said transmission comprising a first electro-magnetically operated relay for controlling operation of said valve means, means connected with said first relay operably responsive to vehicle speed for automatically controlling energization of said first relay, manually operated means connected in parallel with said vehicle speed responsive means, adapted to overrule said vehicle speed responsive means to effect energization of said first relay, a second electro-magnetically operated relay connected in parallel with said first relay, means for effecting ignition interruption arranged so as to be connected in series with said first and second relays upon energization of said relays, conductor means connecting said generator to said second relay, and conductor means connecting said second relay to the control means for said first relay so as to provide means for short circuiting said second relay when said first relay is energized whereby ignition interruption, to facilitate disengagement of said drive control elements, is provided during step-down in the speed ratio drive but prevented during step-up in the speed ratio drive and during engine stall and engine start.

11. In a power transmission for a motor vehicle having an engine provided with an ignition system including an engine driven generator, a driving shaft adapted to receive drive from the engine, a driven shaft adapted to drive the vehicle, change speed means operably disposed between said shafts including relatively movable, positively engageable, drive control elements one of which is movable relative to the other for effecting step-up and step-down variations in the speed ratio drive through the transmission, differential pressure operated means for effecting engagement and disengagement of said drive control elements, electrically operated valve means for controlling operation of said differential pressure operated means, and an electrical control system for said transmission comprising a first electro-magnetically operated relay for controlling operation of said valve means, means connected with said first relay operably responsive to vehicle speed for automatically controlling energization of said first relay, a second electro-magnetically operated relay connected in parallel with said first relay, means for effecting ignition interruption arranged so as to be connected in series with said first and second relays upon energization of said relays, conductor means connecting said generator to said second relay, and conductor means connecting said second relay to the control means for said first relay so as to provide means for short circuiting said second relay when said first relay is energized whereby ignition interruption, to facilitate disengagement of said drive control elements, is provided during step-down in speed ratio drive but prevented during step-up in speed ratio drive and during engine stall.

12. In a power transmission for a motor vehicle having an engine provided with an ignition system including an engine driven generator, change speed means associated with the transmission including relatively movable, positively engageable, drive control elements for effecting step-up and step-down variations in the speed ratio drive through the transmission, differential pressure operated means for controlling relative movement of said drive control elements, electrically operated valve means for controlling operation of said differential pressure operated means, and an electrical control system for said transmission comprising a first electro-magnetically operated relay for controlling operation of said valve means, means connected with said first relay operably responsive to vehicle speed for automatically controlling energization and operation of said first relay, a second electro-magnetically operated relay connected in parallel with said first relay, ignition interruption means connected in series through said first and second relays adapted, upon de-energization of said first relay and energization of said second relay, to provide means for effecting ignition interruption so as to facilitate disengagement of said drive control elements on step-down in the speed ratio drive, means connecting said generator to said second relay so that said second relay may be energized only when said engine is operating, and conductor means connecting said first relay to said second relay so as to provide means for short circuiting said second relay when said first relay is energized to thereby prevent ignition interruption whenever said first relay is energized.

13. In a power transmission for a motor vehicle having an engine provided with an ignition system, a servo-motor actuated shift member for effecting step-up and step-down variation in the speed ratio drive through the transmission, and an electrical control system comprising a first double contact relay adapted to control operation of said servo-motor, the contacts of said first relay being normally biased open and adapted to be closed by energization of a first electro-magnetic means selectively controlled by vehicle speed responsive means and manually operated means connected in a parallel circuit, a second double contact relay for effecting ignition interruption on step-down in the speed ratio drive through the transmission, but arranged to prevent ignition interruption on step-up in the speed ratio drive and during engine start and engine stall, one of the contacts of said second relay being normally biased closed while the other contact is open, ignition interruption means connected in series with one of the contacts of said first relay and with the normally open contact of said second relay, means adapted to short circuit said second relay across said first relay when said first relay is energized to thereby break the circuit through the ignition interruption means so as to render said ignition interruption means inoperative on step-up in the speed ratio drive and on engine start and stall, and electro-magnetic means operable, upon removal of said short circuit by deenergization of said first relay, to open the normally closed contact of said second relay and close the normally open contact of said second relay to render said ignition interruption means operative on step-down in the speed ratio drive.

14. In a power transmission for a motor vehicle having an engine provided with an ignition system, a servo-motor actuated shift member for effecting step-up and step-down variation in the speed ratio drive through the transmission, and an electrical control system comprising a first double contact relay adapted to control operation of said servo-motor, the contacts of said first relay being normally biased open and adapted to be closed by energization of a first electro-magnetic means selectively controlled by vehicle speed responsive means and manually operated means connected in a parallel circuit, a second double contact relay for effecting ignition interruption on step-down in the speed ratio drive through the transmission, but arranged to prevent ignition interruption on step-up in the speed ratio drive and during engine start and engine stall, one of the contacts of said second relay being normally biased closed while the other contact is open, ignition interruption means connected in series with one of the contacts of said first relay and with the normally open contact of said second relay, means adapted to short circuit said second relay across said first relay when said first relay is energized to thereby break the circuit through the ignition interruption means so as to render said ignition interruption means inoperative on step-up in the speed ratio drive and on engine start and engine stall, and electro-magnetic means operable upon deenergization of said first relay to open the normally closed contact of said second relay and close the normally open contact of said second relay to remove the short circuit across the second relay and thereby render said ignition interruption means operative on step-down in the speed ratio drive.

LOUIS B. FORMAN.

REFERENCES CITED

The following references are of record in the file of this patent:

UNITED STATES PATENTS

| Number | Name | Date |
|---|---|---|
| 2,267,603 | Claytor | Dec. 23, 1941 |
| 2,295,715 | Claytor | Sept. 15, 1942 |
| 2,349,297 | Neracher et al. | May 23, 1944 |
| 2,425,890 | Matulaitis | Aug. 19, 1947 |

Certificate of Correction

Patent No. 2,513,791                                                        July 4, 1950

LOUIS B. FORMAN

It is hereby certified that error appears in the printed specification of the above numbered patent requiring correction as follows:

Column 10, line 15, for "ushifted" read *upshifted*;

and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*